United States Patent
Sashida et al.

(10) Patent No.: US 7,666,934 B2
(45) Date of Patent: Feb. 23, 2010

(54) ALIPHATIC POLYESTER RESIN COMPOSITION AND SHEETS, FILMS OR OTHER PRODUCTS MOLDED BY THE RESIN

(75) Inventors: Kazuyuki Sashida, Hirakata (JP); Soichiro Kamiya, Hirakata (JP)

(73) Assignee: Riken Vitamin Co., Ltd., Tokyo (JP)

( * ) Notice: Subject to any disclaimer, the term of this patent is extended or adjusted under 35 U.S.C. 154(b) by 314 days.

(21) Appl. No.: 10/591,043

(22) PCT Filed: Mar. 2, 2006

(86) PCT No.: PCT/JP2006/303973

§ 371 (c)(1), (2), (4) Date: Aug. 29, 2006

(87) PCT Pub. No.: WO2006/098161

PCT Pub. Date: Sep. 21, 2006

(65) Prior Publication Data

US 2008/0242781 A1    Oct. 2, 2008

(30) Foreign Application Priority Data

Mar. 16, 2005   (JP) .............................. 2005-074411

(51) Int. Cl.
    *C08K 5/103*    (2006.01)
(52) U.S. Cl. ..................................... 524/317; 524/315

(58) Field of Classification Search .................. 528/271
    See application file for complete search history.

(56) References Cited

U.S. PATENT DOCUMENTS 6,720,374 B2 *   4/2004   Sashida et al. .............. 524/310

FOREIGN PATENT DOCUMENTS

| EP | 1 270 659 | 1/2003 |
| JP | 2002-060606 | 2/2002 |
| JP | 2004-238579 | 8/2004 |

* cited by examiner

Primary Examiner—Randy Gulakowski
Assistant Examiner—Shane Fang
(74) Attorney, Agent, or Firm—Roylance, Abrams, Berdo & Goodman, L.L.P.

(57) ABSTRACT

Provided is a thermoplastic resin composition, in particular, an aliphatic polyester resin composition comprising a plasticizer which is soft, exhibits high transparency, is reduced in bleeding out and exhibits high resistance to the extraction by a paraffinic solvent; and a sheet, a film or a molded article formed from the thermoplastic resin composition. An aliphatic polyester resin composition, characterized in that it comprises 100 parts by mass of an aliphatic polyester and, as a plasticizer, 1.0 to 100 parts by mass of a specific ester compound which is an ester formed from a trivalent polyhydric alcohol and an acyl group derived from a carboxylic acid having 2 to 18 carbon atoms and has an average acylation degree of 50 to 90%.

2 Claims, No Drawings

ALIPHATIC POLYESTER RESIN COMPOSITION AND SHEETS, FILMS OR OTHER PRODUCTS MOLDED BY THE RESIN

BACKGROUND OF THE INVENTION

1. Field of the invention

The present invention relates to an aliphatic polyester resin composition containing plasticizers, and sheets, films or other products molded by the resin.

2. Description of the Background Art

In recent years, attention has focused on biodegradable plastics which reduce environmental load as a result of increased awareness regarding problems to the human body and natural environment. Examples of biodegradable plastics on which attention has been focused include an aliphatic polyester. Though a polylactic acid as the aliphatic polyester itself is an inherently brittle resin, however flexibility can be applied by adding plasticizers thereto. The application development of polylactic acid has been briskly performed in recent years, and various novel plasticizers capable of being used for the polylactic acid and having a low environmental load have also been proposed.

Though triethylene glycol diacetate, glycerin triacetate, glycerin tripropionate, tributyl acetylcitrate, etc., have been known as plasticizers which apply flexibility with the transparency of the polylactic acid maintained (for example, refer to Patent Reference 1), any of plasticizers and polylactic acid are not sufficiently compatible. When applications to various uses are actually attempted, the increase in the amount of additional plasticizers causes intense bleed out generated from the resin of the plasticizers before obtaining sufficient flexibility, and thereby the increase is not suitable for practical use.

Though a producing method of stretched film made of flexible aliphatic polyester by adding a diaceto monoglyceride fatty acid ester and a polyglycerol monoaliphatic ester as the plasticizer which does not bleed has been known (for example, refer to Patent Reference 2), when the application to a packaging material is attempted using the composition of this technique, sufficient flexibility and transparency are acquired. However, there is a problem that the amount of elution of the plasticizers is large in an elution test due to a paraffin solvent, and correspondence is further desired on a use condition where the plasticizers come into contact with oily food.

The present inventors have previously proposed the use of diacetomonoglyceride fatty acid ester and polyglycerin acetic acid ester as the plasticizers (for example, refer to Patent Reference 3). However, also in the composition, the problem of a shift of the plasticizers to food has not been completely solved.

Japanese Published Unexamined Patent Application No. Hei-11-323113

Japanese Published Unexamined Patent Application No. 2000-302956

Japanese Published Unexamined Patent Application No. 2003-73532

DISCLOSURE OF THE INVENTION

The present invention has been accomplished in view of the above problems in the prior art. Accordingly, it is an object of the present invention to provide a thermoplastic resin composition which contains a plasticizer having flexibility, high transparency, little bleed out and high extraction resistance to a paraffin solvent, particularly an aliphatic polyester resin composition, and a sheet, film, or molded product molded from the same.

The present invention has the following composition so as to attain the above object.

1. An aliphatic polyester resin composition contains a compound (A) of 1.0 mass part to 100 mass parts expressed by the following formula (1) as a plasticizer to an aliphatic polyester of 100 mass parts.

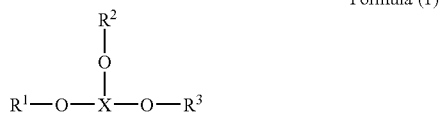

Formula (1)

In the formula, X denotes a trivalent polyalcohol frame; $R^1$, $R^2$, $R^3$ are selected from an acyl group having 2 to 18 carbon atoms or a hydrogen atom; the sum total of carbon numbers of $R^1$, $R^2$, $R^3$ is 10 to 22; and the average acylation rate is 50 to 90%.

2. The aliphatic polyester resin composition according to the item (1), wherein $R^1$, $R^2$, $R^3$ of the formula (1) contain at least one acyl group having a carbon number of 8 to 18.

3. The aliphatic polyester resin composition according to the item (1) or (2), wherein the aliphatic polyester resin is a lactic acid system polyester.

4. Sheets, films, or other products molded from the aliphatic polyester resin composition described in any one of the items (1) to (3).

The present invention can provide effects enumerated below.

(1) The plasticizer is edible, and even when the plasticizer is used as a food packaging material, the safety of the plasticizer is very high.

(2) The plasticizer has excellent plasticization performance, and a flexible aliphatic polyester resin composition can be obtained.

(3) A resin composition having little inhibition of transparency and bleed can be obtained.

(4) The sheet, film or molded product using the aliphatic polyester resin composition of the present invention has high solvent resistance to a paraffin solvent, and the sheet, film or molded product has little shift of the plasticizer to food even when the sheet, the film or the molded product is used to oily food.

DETAILED DESCRIPTION OF THE INVENTION

Hereinafter, the present invention will be explained in detail according to best mode for carrying out the invention.

A thermoplastic resin composition used for the present invention is obtained by adding the compound (A) as a plasticizer to an aliphatic polyester.

The aliphatic polyester of the present invention is not particularly limited, and a known aliphatic hydroxycarboxylic acid or a polymer consisting of an aliphatic diol and an aliphatic dicarboxylic acid can be used. Each of aliphatic hydroxycarboxylic acid, aliphatic diol and aliphatic dicarboxylic acid to be used may be a copolymer using a plurality of kinds. Examples of the aliphatic hydroxycarboxylic acids in the present invention include a lactic acid, a glycolic acid, ε-caprolactone and 3-hydroxy butanoic acid. Examples of the aliphatic diols include ethylene glycol, polyethylene glycol, propylene glycol, butylene glycol, 1,4-butanediol, 1,6-hexanediol and neopentyl glycol. Examples of the aliphatic dicarboxylic acids include a succinic acid, an adipic acid, an azelaic acid, a sebacic acid, a dodecanedioic acid, a maleic acid and a fumaric acid. Of these, the aliphatic dicarboxylic acid including a lactic acid unit in a molecule is preferable in view of the property and biodegradability of the resin. It is preferable that the aliphatic polyester of the present invention contains the lactic acid unit of 30 mol % or more, and particularly preferably 50 mol % or more. The lactic acid used for aliphatic polyester of the present invention may be a D isomer or an L isomer.

The lactic acid system polyester preferably used for the present invention has a crystalline thermoplastic polymer having tensile strength equivalent to that of polyethylene and transparency equivalent to that of polyethylene terephthalate. The lactate polyester is used for sutures, etc., for medical purposes, and has high safety. In addition, when the lactate polyester is burned, the combustion calorie is about one third of those of polyethylene and polypropylene, etc., and an incinerator is not damaged by the combustion. Also, no harmful gas is generated.

The degree of polymerization or quality of the polylactic acid resin to be used is not considered. Not only the homopolymer of the polylactic acid but also a copolymer such as glycolic acid, c-caprolactone, trimethylene carbonate, polyethylene glycol, etc., may be used together. The other biodegradable polymer such as acetylcellulose, polycaprolactone, polybutylene succinate, a copolymer of polyhydroxy butyrate and valerate, chitin, chitosan and starch may be blended in a range where the property of the polylactic acid resin is not spoiled.

A polycarboxylic acid such as malic acid, tartaric acid and citric acid, and a polyalcohol such as glycerin, diglycerin, polyglycerin, trimethylolpropane, pentaerythritol and dipentaerythritol may be polymerized in a range where the performance of the invention is not inhibited. Also, an isocyanate compound, an epoxy compound, an aziridine compound, an oxazoline compound, an azo compound, a polyvalent metal compound, a polyfunctional phosphate ester, an ester phosphate, etc., may be used as a chain extender.

The plasticizer used for the present invention is a compound (A) expressed by the above formula (1). The compound is an ester of trivalent polyalcohol and acyl group derived from a carboxylic acid having 2 to 18 carbon atoms. Though examples of trivalent polyalcohols capable of being used in the present invention include glycerin, trimethylolpropane and hexanetriol, the glycerin is preferable in view of the easy acquisition of the materials. Though the acyl group having 2 to 18 carbon atoms capable of being used in the present invention is not particularly limited, examples thereof include an acetyl group, a propionyl group, a butyryl group, a caproyl group, a caplyroyl group, a lauryl group, a myristyl group, a palmityl group, a stearyl group and an oleyl group.

The sum total of the number of the carbon atoms of the acyl group contained in the compound is 10 to 22. When the sum total of the carbon atoms is less than 10, the boiling point of the compound becomes low, and thereby it is difficult to use the compound as the plasticizers. When the sum total of the carbon atoms is more than 22, the flexibility is worsened, and the bleed out from the resin becomes intense. When the rate (molar ratio) of the acyl group contained in $R^1$, $R^2$, $R^3$ of the formula (1) is the average acylation rate, the average acylation rate of the compound should be within the range of 50 to 90% in the present invention, preferably 55 to 90%. When the average acylation rate is higher than 90%, the solvent resistance to a paraffin solvent is reduced. When the average acylation rate is lower than 50%, the compatibility with the resin is reduced, and the transparency and the flexibility are reduced. The calculation of the average acylation rate is shown in the Examples.

In the formula (1), preferable examples of the combination of carbon number of $R^1$, $R^2$, $R^3$ include (the number of the carbon atoms of $R^1$, the number of the carbon atoms of $R^2$ and the number of the carbon atoms of $R^3$) of (18, 2, 0), (12, 2, 0), (10, 10, 0), (10, 8, 0), (12, 8, 0), (8, 8, 0), (10, 2, 0), (8, 2, 0), (18, 2, 2), (12, 2, 2), (10, 6, 2). The order of the combination of $R^1$, $R^2$, $R^3$ is not particularly limited, and $R^1$, $R^2$, $R^3$ may be in any position. The compound is usually a mixture thereof, and the sum total of the number of the carbon atoms and acylation rate of the acyl group are the average value of the mixture.

The production method of the compound is not particularly limited, and the compound can be produced by adjusting so that the acyl group is less than 3 mol to the trivalent polyalcohol of 1 mol by a known usual producing method of ester. For example, the compound can be produced by the ester exchange reaction of the polyalcohol and polyalcohol triacyl ester. The compound can also be produced by performing the esterification reaction of acyl acid or anhydrous acyl acid to the polyalcohol and polyalcohol monoacyl ester. The mixture obtained by these reactions thereof is distilled and recrystallized, and the sum total of the number of the carbon atoms of the acyl group can also be adjusted.

In the present invention, the blending amount of the plasticizer to resin is within the range of 1.0 to 100 mass parts to the resin of 100 mass parts, and preferably 1.0 to 60 mass parts. When the blending amount is less than the range, the performance is insufficient. When the blending amount exceeds the range, the bleed of the plasticizer is observed, and thereby the performance is reduced.

In this invention, other 1 or 2 or more plasticizers can be used together in the range where the effect of the present invention is spoiled. Though a stabilizer, a lubricant, an antioxidant, a slip agent, a nucleating agent, an antiblocking agent, an antifog additive, an antistatic agent, a filler, etc., are used together if needed, these additive agents can be used together in the range where the effects of the plasticizer of the present invention are not inhibited.

The resin composition of the present invention can be processed into a sheet, a film and a molded product and used by the conventionally known method. For example, the fatty acid polyester, the plasticizer, and the other additive agents are melted and kneaded in a strand die and a two-axle extrusion machine provided with a liquid adding machine, and the strand is cut, and a pellet is formed. A sheet, a film, and a molded product can be respectively formed by an extrusion machine and injection molding machine, etc., provided with a T die or an inflation die by using the obtained pellet. Referring to the formed film and molded product, the mechanical property, heat resistance and dimensional stability of the product can be improved by heat treatment. In such a case, the transparency and the glossiness can be improved by extension treatment.

Hereinafter, though the present invention will be explained in detail according to the Examples, the aspect of the present invention is not limited thereto.

EXAMPLE 1

Glycerin of 920 g (10 mol), a caprylic acid of 1584 g (11 mol), a sodium hydroxide of 2.36 g (0.06 mol) were added into a four-neck flask of 3000 ml equipped with a mercury thermometer, a nitrogen introducing pipe and a stirring stick, and were reacted at 230° C. for 6 hours while flowing nitrogen at 2.0 ml/min and stirring. After the reaction end, the reaction solution was cooled to 80° C. Then, 2.36 g (0.02 mol) of phosphoric acid aqueous solution of 85% was added, and the sediment was removed by depressurization filtration. The obtained reaction liquid of 2400 g was put into a distillation apparatus, and depressurization distillation was performed at the degree of decompression of 1 Pa. The glycerin mono caplylate of 620 g of the fraction in which the distillation temperature is 130° C. to 150° C. was obtained. When the obtained glycerin monocaplylate was analyzed by the method to be described later, the average acylation rate was 33%, and the sum total of the number of the carbon atoms of the acyl group was 10.0.

Next, 218 g (1.0 mol) of the glycerin monocaplylate of the average acylation rate of 33% obtained above were put into a four-neck flask of 500 ml equipped with a mercury thermometer, a nitrogen introducing pipe, a back-flow pipe and a stirring stick, and were heated to 120° C. while flowing nitrogen at 0.5 ml/min and stirring. 66 g (0.65 mol) of acetic anhydride was dropped thereto, and the mixture was reacted at 120° C. for 1 hour. After the reaction end, steam distillation was performed under decompression to remove low boiling substances, and glycerin monocaplylate acetic acid ester (plasticizer 1) was obtained. Table 1 shows the average acylation rate of the plasticizer 1 and the sum total of the number of the carbon atoms of the acyl group.

EXAMPLE 2

Glycerin of 276 g (3.0 mol), a capric acid of 713 g (4.1 mol), a sodium hydroxide of 1.0 g (0.025 mol) were added into a four-neck flask of 1000 ml equipped with a mercury thermometer, a nitrogen introducing pipe and a stirring stick, and were reacted at 230° C. for 6 hours while flowing nitrogen at 2.0 ml/min and stirring. After the reaction end, the reaction solution was cooled to 80° C. Then, 1.0 g (0.0083 mol) of phosphoric acid aqueous solution of 85% was added, and the sediment was removed by depressurization filtration. The obtained reaction liquid of 900 g was put into a distillation apparatus, and depressurization distillation was performed at the degree of decompression of 1 Pa. The glycerin mono & dicaplilate of 650 g of the fraction in which the distillation temperature is 140° C. to 230° C. was obtained. When the obtained glycerin mono & dicaprate was analyzed by the method to be described later, the average acylation rate was 62%, and the sum total of the number of the carbon atoms of the acyl group was 18.6.

Next, 382 g (1.0 mol) of the glycerin mono & dicaprate of the average acylation rate of 62% obtained above and 65 g (0.64 mol) of acetic anhydride were reacted as in the producing example 1 to obtain glycerin mono & dicaprate acetic acid ester (plasticizer 2). Table 1 shows the average acylation rate of the plasticizer 2 and the sum total of the number of the carbon atoms of the acyl group.

EXAMPLE 3

638 g (1.0 mol) of refined coconut oil, 92 g (1.0 mol) of glycerin and 218 g (1.0 mol) of triacetin were put into a four-neck flask of 1000 ml equipped with a mercury thermometer, a nitrogen introducing pipe, a back-flow pipe and a stirring stick, and 1.0 g of sodium hydroxide was added as a catalyst. Nitrogen was flown at 0.5 ml/min, and the obtained solution was heated to 250° C. while stirring. The solution was reacted at 250° C. for 2 hours. After the reaction end, the solution was neutralized by 1.0 g of phosphoric acid aqueous solution of 85%, and the sediment was removed by depressurization filtration. The obtained reaction liquid was put into a distillation apparatus, and depressurization distillation was performed at the degree of decompression of 1 Pa. The coconut oil glycerin acetic acid ester (plasticizer 3) of the fraction in which the distillation temperature is 180° C. to 220° C. was obtained. Table 1 shows the average acylation rate of the plasticizer 3 and the sum total of the number of the carbon atoms of the acyl group.

[Comparative Sample 1]

Glycerin of 920 g (10 mol), a lauric acid of 2121 g (10.5 mol), a sodium hydroxide of 3.0 g (0.075 mol) were added into a four-neck flask of 3000 ml equipped with a mercury thermometer, a nitrogen introducing pipe and a stirring stick, and were reacted at 230° C. for 6 hours while flowing nitrogen at 2.0 ml/min and stirring. After the reaction end, the reaction solution was cooled to 80° C. Then, 3.0 g (0.025 mol) of phosphoric acid aqueous solution of 85% was added, and the sediment was removed by depressurization filtration. The obtained reaction liquid of 2500 g was put into a distillation apparatus, and depressurization distillation was performed at the degree of decompression of 1 Pa. The glycerin monolaurate of 830 g of the fraction in which the distillation temperature is 150° C. to 180° C. was obtained. When the obtained glycerin monolaurate was analyzed by the method to be described later, the average acylation rate was 33%, and the sum total of the number of the carbon atoms of the acyl group was 12.0.

Next, 274 g (1.0 mol) of the glycerin monolaurate obtained above and 37 g (0.36 mol) of acetic anhydride were reacted in the same manner as in the producing example 1 to obtain glycerin monolaurate acetic acid ester (comparative sample 1). Table 1 shows the average acylation rate of the comparative sample 1 and the sum total of the number of the carbon atoms of the acyl group.

[Comparative Sample 2]

638 g (1.0 mol) of refined coconut oil, and 46 g of (0.5 mol) of glycerin were reacted in the same manner as in the producing example 3. The catalyst of a reaction was similarly neutralized and filtered to remove, and coconut oil fatty acid glycerin ester (comparative sample 2) was obtained. Table 1 shows the average acylation rate of the comparative sample 2 and the sum total of the number of the carbon atoms of the acyl group.

[Comparative Sample 3]

274 g (1.0 mol) of the glycerin monolaurate obtained by the method described in the above comparative sample 1 and 180 g (1.76 mol) of acetic anhydride were reacted in the same manner as in the producing example 1 to obtain glycerin monolaurate acetic acid ester (comparative sample 3). Table 1 shows the average acylation rate of the comparative sample 3 and the sum total of the number of the carbon atoms of the acyl group.

[Comparative Sample 4]

Diacetin [commercial item (glycerindiacetate)].

Table 1 shows the average acylation rate of the comparative sample 4 and the sum total of the number of the carbon atoms of the acyl group.

[Comparative Sample 5]

Tributyrin [commercial item (glycerintributyrate)]

Table 1 shows the average acylation rate of the comparative sample 5 and the sum total of the number of the carbon atoms of the acyl group.

[Analysis Method]

Average Acylation Rate and Sum Total of Carbon Number of Acyl Group

A sample is methylesterified by methanol-hydrochloric acid, and methylacylate is extracted in hexane. The mass ratio of the acyl group for every carbon number is calculated by GLC (GC-14A, manufactured by Shimadzu Corp., a detector: FID, a packed column: inner diameter 3 mm×1 m filler: Silicone OV-1). The mol average molecular weight (MW1) of the acyl group is calculated by using the mass ratio. Next, after a polyalcohol contained in a methanol layer is subjected to TMS, and the polyalcohol is analyzed by GLC (GC-14A, manufactured by Shimadzu Corp., a detector: FID, a packed column: inner diameter 3 mm×1 m filler: Silicone OV-1) to similarly calculate the mol average molecular weight (MW2) of the polyalcohol. Then, hydroxyl value (OHV) of a sample is measured based on a standard oil-and-fats analysis method. The average acylation rate and the sum total of the number of the carbon atoms of the acyl group are calculated by the following formula.

Average Acylation Rate=(168300·OHV×MW2)/{3× OHV(MW1−1)+168300}×100

Sum Total of Carbon Number of Acyl Group=3×Average Acylation Rate×(MW1−15)/1400

The analysis results of the plasticizers 1 to 3 and comparative samples 1 to 5 were summarized in the following Table.

TABLE 1

| Kind of Plasticizer | Average Acylation Rate | Sum Total of Carbon Number of Acyl Group |
|---|---|---|
| Plasticizer 1 | 55% | 10.8 |
| Plasticizer 2 | 84% | 20.1 |
| Plasticizer 3 | 70% | 15.0 |
| Comparative Sample 1 | 45% | 12.7 |
| Comparative Sample 2 | 70% | 24.0 |
| Comparative Sample 3 | 92% | 15.5 |
| Comparative Sample 4 | 67% | 4.0 |
| Comparative Sample 5 | 99% | 11.9 |

[Test-1] Tensile Test

The test was performed based on JIS K-7113. Referring to a test specimen, a No. 1 test specimen produced by punching a sheet was prepared and used. The produced test specimen was stored at 23° C. and the humidity of 50% RH for one day, and the stored sample was used for the test. As a testing machine, a tensilone universal testing machine RTC-1310 manufactured by Orientech Co. Ltd., was used. Distance between grip implements were set to 120 mm, and the test rate was set to 200 mm/min.

[Test-2] Transparency

The shaped sheet was spread, and sheet was observed while being held up to a light source to evaluate transparency. In Table 2, ○ denotes transparency, Δ denotes slightly white turbidity, and X denotes white turbidity, respectively.

[Test-3] Bleed Property

The shaped sheet was cut off to 10 cm×10 cm, and the sheet was stored under the condition of the temperature of 50° C. and humidity of 50% for one week. The quantity of the bleed was then observed. In Table 2, ○ denotes no bleed, Δ denotes slight bleed, and X denotes considerable bleed, respectively.

[Test-4] Solvent Extraction

The shaped sheet was pressed to shape to 10 cm×10 cm×0.1 mm, and was immersed in n-heptane of 400 ml to extract at 25° C. for 1 hour. After extraction, n-heptane of 300 ml was measured, and was condensed in a rotary evaporator. The condensed n-heptane was then moved to an evaporating dish, and was evaporated to dryness at 105° C. for 2 hours. The weight of the evaporation residue at that time was weighed, and the content of the evaporation residue to n-heptane of 300 ml was calculated. The content of the evaporation residue exceeding 30 ppm at this time was set to X, and the content of the evaporation residue of 30 ppm or less was set to ○.

EXAMPLES 1 TO 5

To 100 mass parts of a polylactic acid resin (Lacea H-440, manufactured by Mitsui Chemicals, Inc.) heated and dried at 110° C. for 5 hours, mass parts of plasticizers 1 to 3 shown in the following Table and 1.0 mass part of stearic acid amide were added, and were pushed out at 190° C. by a two-axle extrusion machine provided with a strand die. The strand was then cut to produce a pellet. The produced pellet was pushed out at 200° C. in a single axis extrusion machine provided with a T die to shape a sheet having a thickness of 1 mm. The tests 1 to 4 were performed using the shaped sheet, and the tests were evaluated. The results were summarized in Table 2.

COMPARATIVE EXAMPLES 1 TO 7

One using no plasticizer to the above polylactic acid resin, and one using the comparative samples 1 to 5 were similarly estimated as in Examples 1 to 5. The results were summarized in Table 2.

Table 2 shows the evaluation results.

TABLE 2

|  | Added Samples | Added Part (mass part) | Tension Maximum Point Stress (MPa) | Tension Modulus (MPa) | Transparency | Bleed | Solvent Extraction |
|---|---|---|---|---|---|---|---|
| Example 1 | Plasticizer 1 | 20 | 14.5 | 15.9 | ○ | ○ | ○ |
| Example 2 | Plasticizer 2 | 20 | 15.8 | 16.2 | ○ | ○ | ○ |
| Example 3 | Plasticizer 3 | 20 | 21.5 | 18.8 | ○ | ○ | ○ |
| Example 4 | Plasticizer 1 | 10 | 28.8 | 23.5 | ○ | ○ | ○ |
| Example 5 | Plasticizer 2 | 45 | 8.0 | 10.3 | ○ | Δ | ○ |
| Comparative Example 1 | None | 0 | 81.4 | 2160 | ○ | ○ | ○ |
| Comparative Example 2 | Comparative Example 1 | 20 | 38.8 | 50.5 | Δ | Δ | ○ |
| Comparative Example 3 | Comparative Example 2 | 20 | 39.5 | 49.9 | Δ | X | X |
| Comparative Example 4 | Comparative Example 3 | 20 | 28.6 | 25.8 | ○ | Δ | X |
| Comparative Example 5 | Comparative Example 4 | 20 | 33.5 | 39.9 | ○ | Δ | X |

TABLE 2-continued

| | Added Samples | Added Part (mass part) | Tension Maximum Point Stress (MPa) | Tension Modulus (MPa) | Transparency | Bleed | Solvent Extraction |
|---|---|---|---|---|---|---|---|
| Comparative Example 6 | Comparative Example 5 | 20 | 18.6 | 15.8 | Δ | Δ | x |
| Comparative Example 7 | Plasticizer 3 | 120 | 8.8 | 9.5 | Δ | x | x |

Though the sheet, film and molded product obtained by processing the resin composition of the present invention can be used for various applications such as foods, medical goods, cosmetics, manure, electric appliances, paper products, and those wastes, is possible, the sheet, the film and the molded product have favorable solvent resistance to a paraffin solvent such as hexane, heptane and a liquid paraffin. Thereby, when used for the packaging material coming into contact with oily food, the shift of the plasticizers to the food is preferably few. Therefore, the sheet, the film and the molded product are suitably used for foods such as green stuffs, fruits, fishes and shellfishes, meats, grains, dry goods, baked goods, dairy products, noodles, confectioneries, wild grasses, seasonings, and as packaging materials of waste thereof.

What is claimed is:

1. An aliphatic polyester resin composition contains a compound (A) of 1.0 mass part to 100 mass parts expressed by the following formula (1) as a plasticizer to an aliphatic polyester of 100 mass parts, wherein said aliphatic polyester resin is a lactic acid polyester,

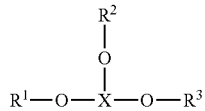

Formula (1)

in the formula, X denotes a trivalent polyalcohol frame; $R^1$, $R^2$, $R^3$ are selected from an acyl group having 2 to 18 carbon atoms or a hydrogen atom; and where $R^1$, $R^2$, $R^3$ contain at least one acyl group having 8 to 18 carbon atoms, the sum total of carbon numbers of $R^1$, $R^2$, $R^3$ is 10 to 22; and the average acylation rate is 55 to 90% to obtain high solvent resistance to a paraffin system solvent.

2. Sheets, films, or products molded from the aliphatic polyester resin composition described in claim 1.

* * * * *